June 22, 1937.  T. WALLIS ET AL  2,084,419
DEHYDRATING ORGANIC LIQUIDS
Filed March 23, 1932   2 Sheets-Sheet 1
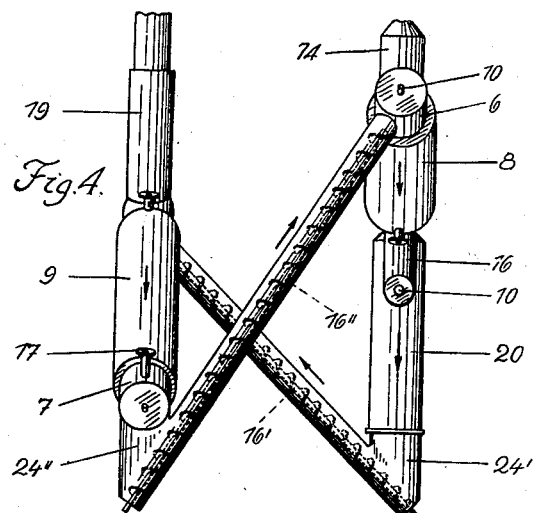
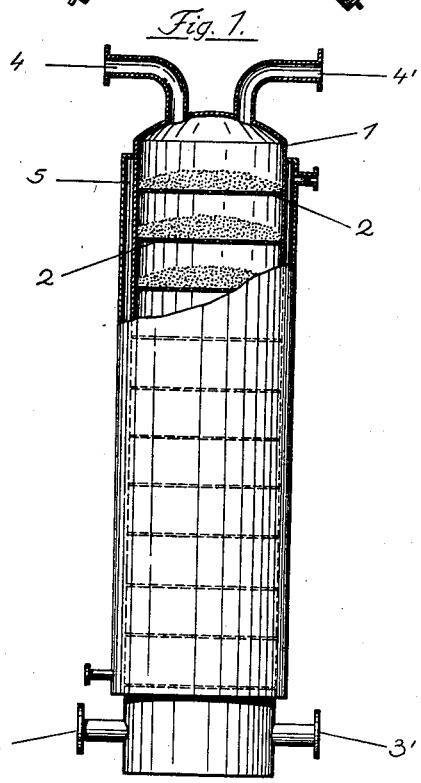
Inventors:
Theodor Wallis,
Oskar Falck,
By Attorneys

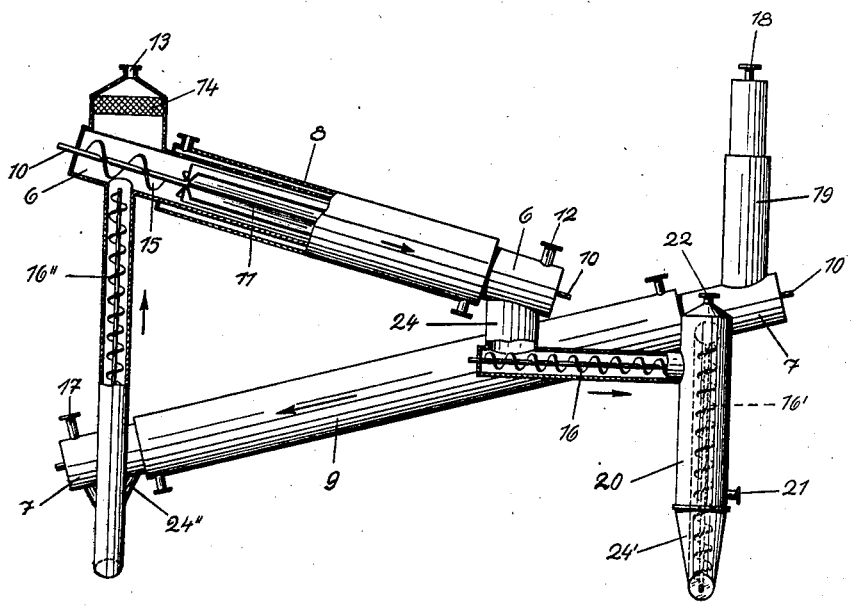
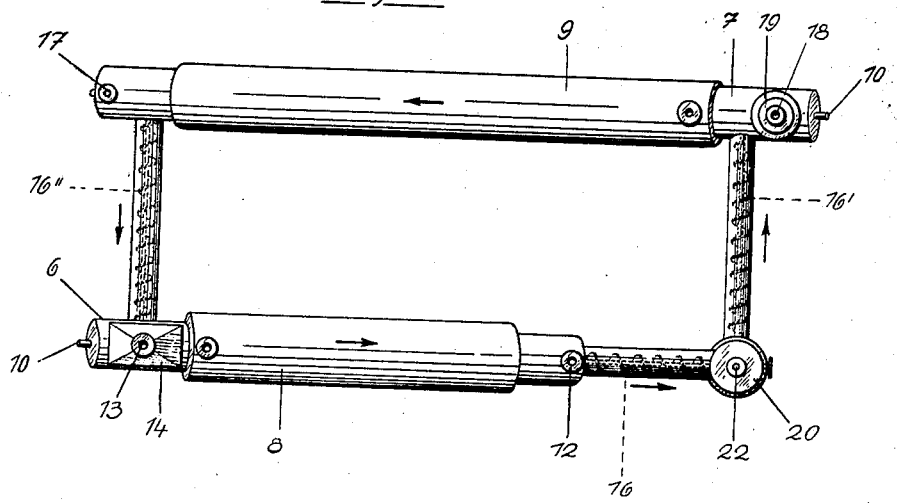

Patented June 22, 1937

2,084,419

UNITED STATES PATENT OFFICE 2,084,419

DEHYDRATING ORGANIC LIQUIDS

Theodor Wallis, Dessau-Ziebigk in Anhalt, and Oskar Falek, Wiederitzsch, near Leipzig, Germany, assignors to I. G. Farbenindustrie Aktiengesellschaft, Frankfort-on-the-Main, Germany Application March 23, 1932, Serial No. 600,730
In Germany March 30, 1931

3 Claims. (Cl. 202—68)

Our present invention relates to a new method for dehydrating organic liquids and apparatus therefor.

One of its objects is to provide a new dehydrating agent which easily can be regenerated.

Another object of our invention is to provide a process in which the complete or nearly complete dehydration is carried out in a minimum of time by bringing the liquid to be dehydrated in contact with the dehydrating agent in the gaseous state.

An additional object of our invention is the new apparatus for carrying out continuously the dehydration of the liquid and regeneration of the drying agent.

Further objects of our invention will be seen from the detailed specification following hereafter.

It is known that fractional distillation is not applicable for separating from organic liquids water contained in them in those cases in which the boiling points of the constituents are close together, or in which the liquid forms an azeotropic mixture with water, or in which the organic compound undergoes decomposition when heated with water.

As examples there may be named from among the large number of such cases:—acetal, aldehyde-ammonia, formic acid, amylene hydrate, crotonaldehyde, acetic acid, isobutyl alcohol, isopropyl alcohol, piperidine and pyridine.

Processes are known for drying organic liquids by the addition of dehydrating agents which bind water (calcium oxide, calcium chloride, sodium hydroxide, potassium carbonate, sodium sulfate or copper sulfate); in most of the cases above referred to, however, these processes do not lead to the desired result or the dehydration is unduly slow.

The subject of the present invention is a process in which there is used as dehydrating agent a calcium sulfate which is obtained by subjecting commercial plaster of Paris, advantageously in ground condition, to a temperature of about 160° to 180° C. or higher, until the water of crystallization has been completely expelled. Calcium sulfate (anhydrous) which has been thus dehydrated removes remarkably quickly 6.6 per cent of its weight of water from organic liquids, reverting to the non-hardening semi-hydrate; it does not part with this water even when heated up to 110° C., so that liquids which have been dehydrated by its use can be obtained in an anhydrous state by distillation either at normal pressure or under reduced pressure.

A further advantage in the use of calcium sulfate which has been dried at about 160° C. or higher lies in its neutral reaction and in the ease with which it can be regenerated at a temperature of about 160 to 180° C.; in the latter respect it is approached by no other drying agent.

Naturally instead of preparing the anhydrous calcium sulfate from the semi-hydrate (plaster of Paris) it is also impossible to start from the dihydrate (mineral gypsum) and to dehydrate this directly at a temperature of about 160° C. or higher so as to obtain anhydrous calcium sulfate.

According to the present invention, organic liquids are dehydrated by causing the dehydrating agent (that is to say calcium sulfate which has been completely dehydrated at about 160 to 180° C. or higher) to act on the vapors of the liquid which is to be dehydrated. It was not to be expected that the short time of contact of the vapor with the dehydrating agent would suffice for the complete absorption of the water from the vapor and the production of a condensate which is free from water. By means of suitable apparatus it is possible in accordance with the invention to conduct the dehydrating of the vapors and the regeneration of the dehydrating agent periodically without removal of the latter from the apparatus. On the other hand, it is also possible in a completely continuous mode of operation to cause the dehydrating agent to circulate first in countercurrent to the vapors, which are thereby freed from the water, and then through a more highly heated portion of the apparatus, where it gives up its water and from which it returns to the portion of the apparatus traversed by the vapors.

As has been above indicated, the invention is particularly suited to the dehydration of liquids whose boiling points are close to that of water, and especially in cases in which constant boiling mixtures are formed, for example in the case of acetal, acetaldehyde, acetaldehyde-ammonia, formic acid, amylene hydrate, ethyl alcohol, propyl alcohol, isopropyl alcohol, isobutyl alcohol, chloral, chlorhydrin, chloracetone, pyridine and its homologues, cyclohexanol and others.

The content of water in the liquids to be dehydrated may vary within wide limits, especially in the continuous mode of operation, wherein care must be taken that for each 5 parts of water vapor present in the vapors obtained by distillation of the liquid, 100 to 120 parts of dehydrated calcium sulfate are brought into contact with the vapors in the same interval of time.

In practice, the limit is dependent on the question as to whether the expenditure of steam which would be required for fractionating the liquid is substantially more economical than the dehydration of the necessary quantity of calcium sulfate; in the case of substances which can be fractionated only with difficulty such as isopropyl alcohol and isobutyl alcohol this limit is reached at a content of water of about 25–35 per cent. However, the process is also applicable in the case of liquids containing even 80 per cent of water where special circumstances may render its application advantageous.

The following examples illustrate the process of the invention and an apparatus suitable therefor, reference being made to the accompanying drawings in which Fig. 1 shows a drying tower, partially in section, Fig. 2 is a side view (partially in section) of a combination of drying tubes for carrying out the dehydration continuously with regeneration of the dehydrating gypsum, Fig. 3 shows the combination of Fig. 1 seen from above, Fig. 4 is a front view of Fig. 1.

In Figs. 2 to 4 the same reference characters are used to indicate the same parts.

Example 1. Periodic mode of operation

The apparatus is illustrated in Fig. 1.

Through a tower 1 of height 2 meters and diameter 10 cm. which contains 150 successive layers 2 each consisting of a fine wire net, a layer of glass rings and 100 grams of plaster of Paris distributed thereon, there is first passed a current of hot air through the inlet 3 and the outlet 4 or vice versa at about 200° C. until the plaster has been completely dehydrated. There are then passed through the tower through the inlet 3' and the outlet 4' in the course of 2 hours 25 kilos of the vapors of pyridine having a water content of 3 per cent, the pressure being somewhat reduced in order to maintain a boiling temperature of 100 to 110° C.; the contents of the tower being held at that temperature by the hot water jacket 5. On cooling the vapors leaving the tower at 4' pyridine is obtained in anhydrous state. The alternate dehydration of the calcium sulfate by means of hot air and of the pyridine vapors by the dehydrated calcium sulfate can be repeated as often as may be desired.

Example 2. Continuous mode of operation

The apparatus used is illustrated in Figs. 2 to 4 of the accompanying drawings:—

In these figures 6 and 7 are two drums arranged in any desired manner with respect to one another, preferably, however, inclined to each other. They are combined by conveying tubes and operate in contrary direction so as to cause about 5 tons of calcium sulfate to circulate per hour in the direction shown by the arrows. Both the drums 6 and 7 are provided with jackets 8 and 9 in order to heat them to the desired temperature. Care is taken to ensure that the calcium sulfate is well distributed over the whole cross-section of the drums by the provision of suitable devices ensuring a passage of the gypsum through the drums in form of thin layers. This may be reached, for instance, by a rotating axis 10 bearing wings 11 which fling the calcium sulfate against the inner wall of the drums 6 and 7 while it is forwarded therethrough.

Through the drum 6 there is passed in counter-current to the dehydrated calcium sulfate the vapors of ethyl alcohol of 95 per cent strength at the rate of 4 tons per hour, the vapors being introduced into the drum at 12. Condensation of vapors inside the drum 6 is prevented by suitable external heating with the aid of the jacket 8 so as to maintain a temperature of about 80 to about 100° C. Depending on the duration of the contact between the calcium sulfate and the vapors, water is withdrawn from the vapors by the calcium sulfate in a manner which can be completely controlled, so that there leave the drum 6 at 13 the vapors of alcohol of 99.1 to 100 per cent strength by weight. 14 is a dust filter retaining the calcium sulfate which may be carried away by the alcohol vapors; by a short worm 15 provided on the axis 10, this calcium sulfate is brought back into the area of the wing axis 11.

From the lower end of the drum 6, the calcium sulfate which has taken up water and for the greater part is in form of its semi-hydrate, is transferred by means of conveyers 16 and 16' into the upper part of the drum 7 where it is completely converted into the anhydride. This may be done by acting in counter-current upon the semi-hydrate with heated air or furnace gases having a temperature above 160° C., so that it again gives up its water. The hot air enters the drum at 17 and leaves it at 18 after having passed the dust separator 19. Preferably, however, the calcium sulfate is dehydrated in the drum 7 by condensing steam of 8 to 10 atmospheres pressure or the vapors of an organic liquid having a boiling point of about 160 to 190° C., for example orthodichlorobenzene, in a jacket 9 surrounding the drum, the condensate being returned continuously from the jacket to the vaporizer (not shown). In this case, only a weak circulation of air through the drum 7 is necessitated in order to carry away the steam.

Between the drums 6 and 7 there may be advantageously interposed a small tower 20 in which the descending calcium sulfate is freed from any adherent residue of alcohol by a counter-current of superheated steam entering at 21; such alcohol is obtained in dilute form by condensation of the vapors leaving the tower at 22. A gas-tight connection between the drums and the tower is advantageously ensured by the conveyer screw 16' situated at a lower level than the drums and operating in an upwardly inclined direction, the calcium sulfate being supplied to it through a down pipe 24'. In said pipe 24' always sufficient calcium sulfate will be present to avoid gas circulation between drums 6 and 7. A similar occlusion may be provided at 24. At the other end of the drum 7 the gypsum now in the anhydrous form is conveyed to the drum 6 by the upwardly inclined conveyer screw 16'', the gas-tight connection being likewise reached by providing a down pipe 24'', where a sufficient amount of gypsum is allowed to accumulate.

Example 3. Continuous mode of operation for the dehydration of liquids containing much water The apparatus described in Example 2 is modified by increasing the dimensions of the drum 7 serving for the dehydration of the calcium sulfate so that its diameter and length are respectively twice and 1½ times the diameter and length of the drum 6 in which the vapors of the liquid are dehydrated.

4.3 tons of isopropyl alcohol of 70 per cent strength, that is to say containing 1.3 tons of water, are vaporized per hour and the vapors are passed in the direction from 12 to 13 through the drum 6, through which there are passed in the same interval of time and in counter-current 26 tons of dehydrated calcium sulfate. Provided that the calcium sulfate is well distributed, a period of contact of 4 to 8 seconds suffices for complete dehydration of the vapors, which leave the drum with a degree of purity of 99.6 to 99.7 per cent. The calcium sulfate is dehydrated in the drum 7 in the manner described above.

In order to counteract adherence of the drying agent to the walls of the apparatus, there may be mixed with the calcium sulfate a finely powdered or finely porous inert substance, which diminishes both the friction between the calcium sulfate and the walls of the apparatus and the internal friction of the mass of calcium sulfate and thus practically excludes adherence to the walls of the vessel and caking into lumps. Examples of such substances are silica gel, kieselguhr, talc, fuller's earth, clay, iron oxide, sand or coke. In most cases an addition of 2 to 5 per cent of one of these substances suffices. If necessary the proportion can be increased.

Our new process likewise is of high value when dehydrating mixtures of organic liquids. As well known, a great number of organic liquids cannot be separated from a mixture by fractional distillation, if water is present, since a plurality of azeotropic mixtures is formed the boiling points of which are close together. This is the case, for instance, with the mixture of alcohols and other organic compounds obtained in the manufacture of synthetic alcohols and containing, for instance, methyl alcohol, propyl alcohol and other higher alcohols in the presence of water. If, however, such a mixture is dehydrated in the manner described above, the individual constituents can be easily obtained by guiding the dehydrated vapors leaving the drum 6 at 13 through one of the known fractionating devices. In this manner, the fractionation of the mixture can be immediately joined with the dehydration.

It is obvious that our invention is not limited to the examples given above or to the specific details given therein. Thus, for instance, the heating jackets 8 and 9 surrounding drums 6 and 7 may be devided in several zones, if a different heating of different parts of these drums seems necessary. In order to avoid loss of the liquid to be dehydrated, a heating of the ends of drum 6 (not surrounded by the jacket as illustrated in the drawings) may be provided, so that the organic liquid, eventually absorbed by the gypsum, is expelled. Then the provision of tower 21 may be dispensed with.

On the other hand it may be necessary to cool the calcium sulfate dehydrated at 180° C. or at a somewhat higher temperature before entering the drum 6. A cooling of the dehydrating agent likewise can be necessitated in the drum 6, since the formation of the semihydrate is an exothermic reaction, so that in the case of high water absorption the reaction temperature becomes too high. Under these conditions advantageously a heating jacket at 24 is provided as mentioned above.

When dehydrating organic liquids having a somewhat higher boiling point, the application of reduced pressure may be foreseen.

The dehydration of the calcium sulfate semihydrate (or eventually dihydrate) is carried out, as mentioned above, at 160 to 180° C.; it may be performed quicker if desired at a higher temperature, care being taken, however, that no overburning of the gypsum takes place. Since the temperature of the dehydrating agent during water absorption shall not be considerably higher than the boiling point of the liquid to be dehydrated generally 160 to 180° C. are sufficient for the regeneration of the anhydrous sulfate.

These and various modifications and changes in details of construction and arrangement of parts are considered to be within the spirit of the invention and the scope of the following claims.

What we claim is:—

1. A process for dehydrating continuously organic liquids which at the beginning of the process contain some water and do not chemically react with calcium sulfate, which comprises completely dehydrating calcium sulfate at about 160 to about 180° C., vaporizing the liquid to be dried, distributing the anhydrous calcium sulfate, passing the vapors of the liquid through the calcium sulfate in countercurrent and in such an amount that by absorption of water the anhydrous calcium sulfate is converted into the semihydrate, withdrawing the latter from the dehydration zone, subjecting it to a temperature of about 160 to about 180° C., until it is again transformed into the anhydride and reconveying it into the dehydration zone for the vapors of the organic liquid.

2. A process for dehydrating continuously ethyl alcohol which at the beginning of the process contains some water, which comprises completely dehydrating calcium sulfate at about 160 to about 180° C., vaporizing the alcohol to be dried, distributing the anhydrous calcium sulfate, passing the alcohol vapors through the calcium sulfate in countercurrent and in such an amount that by absorption of water the anhydrous calcium sulfate is converted into the semihydrate, withdrawing the latter from the dehydration zone, subjecting it to a temperature of about 160 to about 180° C., until it is again transformed into the anhydride and reconveying it into the dehydration zone for the alcohol vapors.

3. A process for dehydrating continuously ethyl alcohol of 95% strength which comprises completely dehydrating calcium sulfate at about 160 to about 180° C., vaporizing the alcohol to be dried, distributing the anhydrous calcium sulfate, passing the alcohol vapors through the calcium sulfate in countercurrent and in such an amount that by absorption of water the anhydrous calcium sulfate is converted into the semihydrate, withdrawing the latter from the dehydration zone, subjecting it to a temperature of about 160 to about 180° C. until it is again transformed into the anhydride and reconveying it into the dehydration zone for the alcohol vapors.

THEODOR WALLIS.
OSKAR FALEK.